United States Patent
Ejim

(10) Patent No.: US 11,773,703 B2
(45) Date of Patent: Oct. 3, 2023

(54) ANTI-BACKSPIN DEVICE FOR ELECTRICAL SUBMERSIBLE PUMPS

(71) Applicant: Saudi Arabian Oil Company, Dhahran (SA)

(72) Inventor: Chidirim Enoch Ejim, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 297 days.

(21) Appl. No.: 17/178,828

(22) Filed: Feb. 18, 2021

(65) Prior Publication Data
US 2022/0259956 A1    Aug. 18, 2022

(51) Int. Cl.
| | | |
|---|---|---|
| *E21B 43/12* | (2006.01) | |
| *H02K 5/132* | (2006.01) | |
| *F04D 13/10* | (2006.01) | |
| *F04D 29/053* | (2006.01) | |
| *H02K 7/10* | (2006.01) | |
| *F04D 29/043* | (2006.01) | |

(52) U.S. Cl.
CPC ............ *E21B 43/128* (2013.01); *F04D 13/10* (2013.01); *F04D 29/043* (2013.01); *F04D 29/053* (2013.01); *H02K 5/132* (2013.01); *H02K 7/10* (2013.01); *F05D 2270/116* (2013.01)

(58) Field of Classification Search
CPC .... E21B 43/128; F04D 29/043; F04D 29/053; F04D 13/10; H02K 5/132; F05D 2270/116
See application file for complete search history.

(56) References Cited

U.S. PATENT DOCUMENTS

| | | | |
|---|---|---|---|
| 1,883,966 A | | 10/1932 | Krause |
| 4,262,786 A | | 4/1981 | Taylor |
| 5,350,242 A | * | 9/1994 | Wenzel ................... E21B 4/003 384/97 |
| 5,551,510 A | | 9/1996 | Mills |
| 6,135,740 A | * | 10/2000 | Hult ...................... E21B 43/126 166/68 |
| 8,776,915 B2 | | 7/2014 | Beylotte et al. |
| 9,777,540 B2 | * | 10/2017 | Downie ................... E21B 4/02 |
| 10,081,982 B2 | | 9/2018 | Agarwal et al. |
| 10,411,557 B2 | | 9/2019 | Hashish et al. |
| 2011/0214963 A1 | * | 9/2011 | Beylotte ................ F16D 41/16 192/106 R |

(Continued)

*Primary Examiner* — Robert E Fuller
(74) *Attorney, Agent, or Firm* — Bracewell LLP; Constance G. Rhebergen; Keith R. Derrington

(57) ABSTRACT

A shaft in an electrical submersible pumping system is prevented from rotation in a backspin direction, which is in a direction opposite from its typical forward rotation during normal operation. Backspin rotation is prevented with a device that includes teeth coupled to the shaft and a stationary pawl disposed in a rotational path of the teeth. Each tooth has a forward surface that contacts the pawl during forward rotation of the shaft, the forward surfaces are each configured with a profile to slide along and past the pawl without impeding shaft rotation. Rotation in the backspin direction engages the pawl with rearward surfaces of the teeth, which are configured to impede shaft rotation when engaged. Fluid being handled by the pumping system flows through a passage in the device and absorbs friction generated thermal energy from the device.

18 Claims, 5 Drawing Sheets

(56) References Cited

U.S. PATENT DOCUMENTS

2015/0275581 A1* 10/2015 Agarwal .................. E21B 4/00
  175/57
2020/0063541 A1  2/2020 Davis
2021/0095674 A1* 4/2021 Lu .......................... F04D 13/10

* cited by examiner

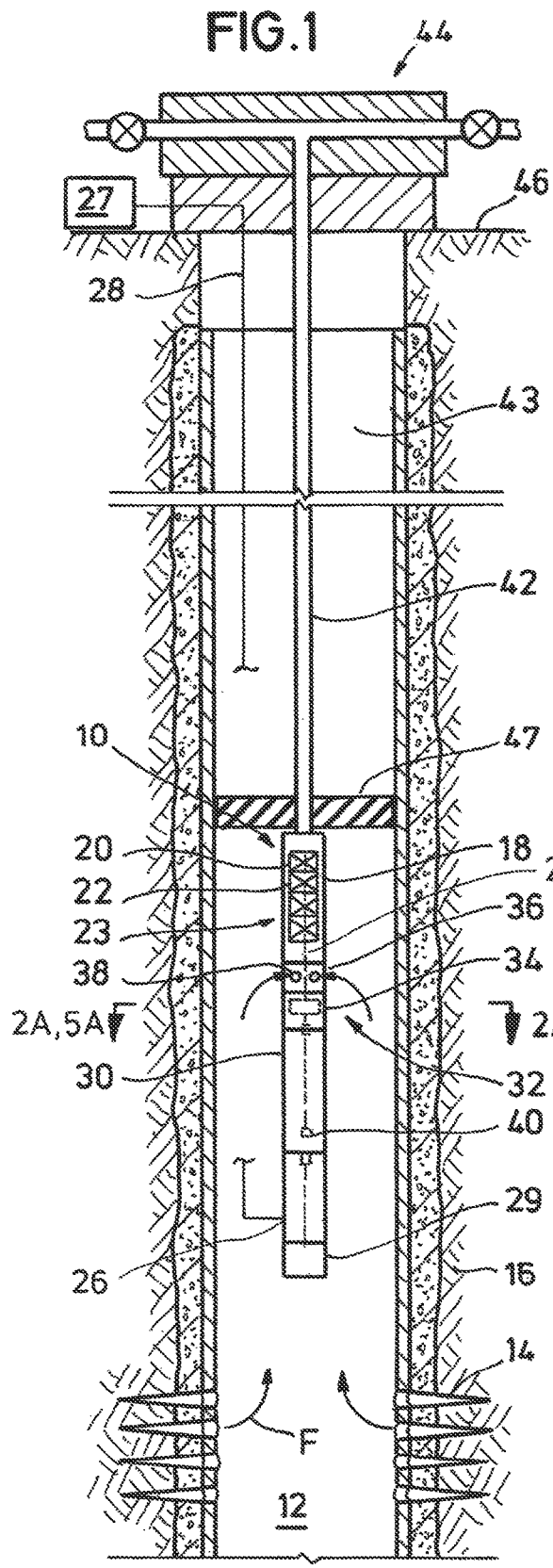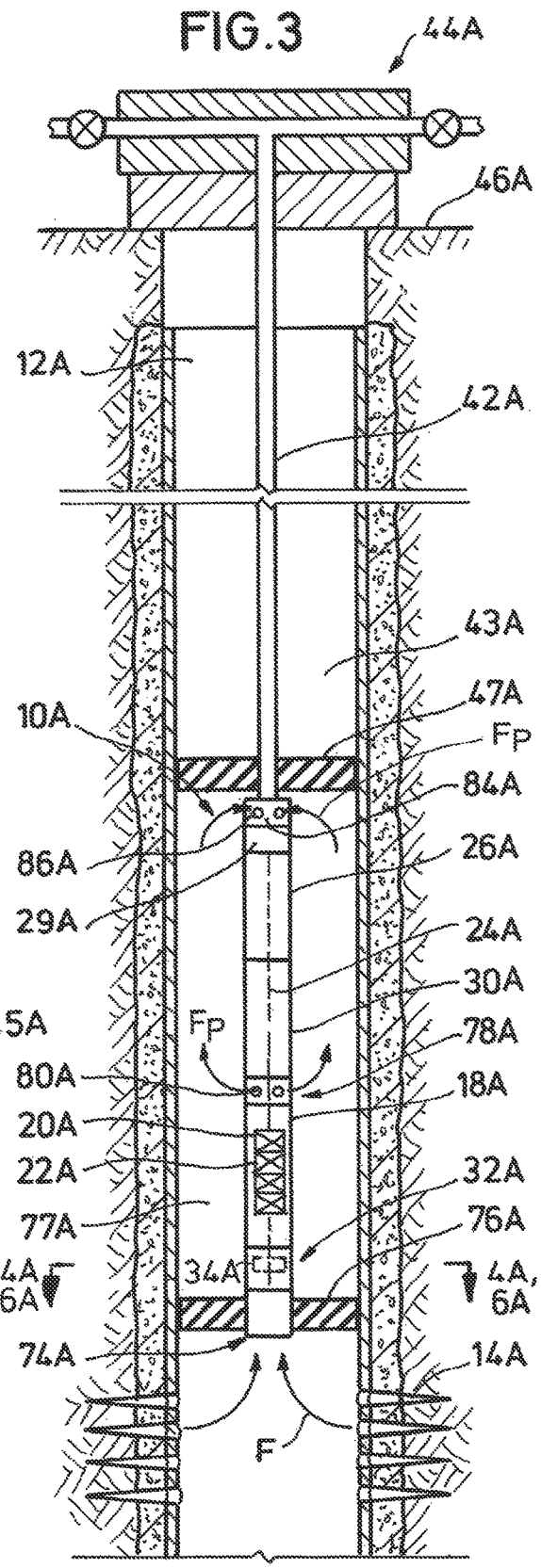

ANTI-BACKSPIN DEVICE FOR ELECTRICAL SUBMERSIBLE PUMPS

BACKGROUND OF THE INVENTION

1. Field of Invention

The present disclosure relates to preventing backspin in electrical submersible pumps with a mechanical device that interferes with rotation in the backspin direction.

2. Description of Prior Art

In some fluids producing wells formation pressure is insufficient to lift liquids in the well to surface, which in some instances occurs over time as the formation fluids become depleted. One technique employed for artificially lifting liquids from within these lower pressure wells is to deploy an electrical submersible pumping ("ESP") system for pumping the liquids to surface. ESP systems are also sometimes used to transfer fluids from a wellsite to other equipment or facility for further processing. The fluids are usually made up of hydrocarbon and water. When installed, a typical ESP system is suspended in the wellbore at the bottom of a string of production tubing. Sometimes, ESP systems are inserted directly into the production tubing. In addition to a pump, ESP systems usually include an electrically powered motor for driving the pump, and a seal section for equalizing pressure in the motor to ambient pressure. Electricity for energizing the motor is usually provided via a power cable that attaches to a power source on surface. Inside the pump motor are stator windings that are spaced radially outward from a rotor that mounts onto a motor shaft, energizing the windings creates an electromagnetic force that rotates the rotor and motor shaft. Centrifugal pumps usually have a stack of alternating impellers and diffusers coaxially arranged in a housing along a length of the pump. The impellers each couple to the motor shaft and rotate with motor shaft rotation to force fluid through passages that helically wind through the stack of impellers and diffusers. The produced fluid is pressurized as it is forced through the helical path in the pump. The pressurized fluid is discharged from the pump and into the production tubing, where the fluid is then conveyed to surface for processing and distribution downstream.

Typically the impellers are designed to pressurize the fluid when rotating in a particular direction (e.g. clockwise or counterclockwise). But in some operating scenarios liquids in the production tubing are allowed to flow back downhole and through the impeller and diffuser stack while the ESP is not being powered, which causes the impellers to rotate in a direction opposite that when pressurizing the production fluid. Rotation of the impellers in this opposite direction is commonly referred to as backspin. In some field operational scenarios liquid is forced downhole into the production tubing and through the ESP, such as when killing a well, bull-heading, or acidizing; these operations also usually result in shaft backspin. Because of the coupling between the impellers and motor shaft, the rotor will rotate with impeller rotation and in the same direction. Backspin of the impeller rotates the rotor in a backward direction that is opposite to that when the motor is being energized and driving the pump. When spinning in the backward direction the motor generates high voltage electricity that is transmitted up the power cable and back to surface. Such voltages on reaching the surface are a potential hazard to personnel working near the wellhead; which can be avoided by arresting backspin in the ESP system.

SUMMARY OF THE INVENTION

Disclosed is an example of an electrical submersible pumping system for lifting fluid from a well and that includes a pump in selective communication with the fluid, a structure, a motor rotationally coupled to the pump by a shaft that selectively rotates with respect to the structure, and an anti-backspin device that is made up of a tooth mounted on the shaft that follows a rotational path with rotation of the shaft, a pawl coupled to the structure and disposed in a location that is intersected by the rotational path, a profile on a forward surface of the tooth that is in selective sliding contact with the pawl when the shaft rotates in a forward direction, and a profile on a rearward surface of the tooth that is in interfering contact with the pawl when the shaft rotates in a backspin direction and that restricts rotation of the shaft in the backspin direction. In an example, the structure is a solid member affixed within a housing that covers a portion of the electrical submersible pumping system. The pawl optionally includes an elongated member having an end pinned to the structure and an opposing end that abuts the rearward surface of the tooth when the shaft rotates in the backspin direction. In an alternative, the pawl is disposed in a slot formed in the structure, and optionally the pawl is urged radially inward by a resilient member in the slot, in a further alternative a pedestal is included that is adjacent the spring in the slot, wherein the pawl is rotatable about a pinned connection that extends radially to the shaft, so that when the shaft rotates in the forward direction contact between the tooth and the pawl pivots the pawl about the pinned connection to impinge the spring into a compressed configuration and rotate the pawl out of rotational path, and when the shaft rotates in the rearward direction contact between the tooth and the pawl pivots the pawl about the pinned connection into arresting contact with the pedestal and maintains the pawl in the rotational path and in interfering contact with the tooth. In an embodiment, fluid being handled by the pump flows through a passage in the structure that is spaced radially outward from the rotational path, and in this embodiment the passage can be strategically disposed to absorb thermal energy from the anti-backspin device; and in a further alternative the pawl is disposed in a slot in the structure, and a channel extends between the slot and to a location in the passage having a narrowed cross sectional area, so that when fluid flows through the passage a pressure difference between the throat and slot urges the pawl radially outward in the slot and out of the rotational path. The electrical submersible pumping system optionally includes a covering around the tooth and pawl that defines a sealed enclosure, and wherein a lubricant is retained in the sealed enclosure. The pump, motor, and anti-backspin device are optionally made up of a string that mounts to a lower end of production tubing that is disposed in the well, wherein the structure makes up an outer housing of the anti-backspin device, and wherein the anti-backspin device is selectively disposed at different locations along a length of the string.

An alternate example of an electrical submersible pumping system is disclosed that includes a housing deployed in the well, a pump having impellers, diffusers, an inlet in communication with wellbore fluid, and a discharge in communication with pressurized wellbore fluid, a motor in electrical communication with a source of electricity, a shaft disposed in the housing having opposing ends respectively coupled with the pump and the motor, a tooth attached to an outer surface of the shaft; and a pawl coupled with the housing that is in sliding contact with the tooth when the shaft rotates in a forward direction, and in interfering contact with the tooth when the shaft rotates in a backspin direction and that blocks rotation of the shaft in the backspin direction. In an alternative, the housing, pawl, and tooth define an anti-backspin device that is selectively installed at opposing ends of the pump and the motor. The anti-backspin device optionally includes a cover that encloses portions of axial ends of the anti-backspin device to define an enclosure. In an alternative, a passage extends axially through the anti-backspin device and radially outward from the pawl. In an example, the wellbore fluid being handled by the pump flows through the passage, and optionally the shaft extends axially through portions of the cover, and bearings are disposed along an interface between the shaft and cover, and further optionally the passage is strategically placed so that thermal energy generated in the bearings by rotation of the shaft is transferred to the fluid flowing through the passage.

BRIEF DESCRIPTION OF DRAWINGS

Some of the features and benefits of the present invention having been stated, others will become apparent as the description proceeds when taken in conjunction with the accompanying drawings, in which:

FIG. 1 is a side sectional view of an example of an ESP system deployed in a wellbore, and having an anti-backspin device.

FIG. 3 is a side sectional view of an alternate example of the ESP system of FIG. 1 and having an anti-backspin device.

Figure 2A:
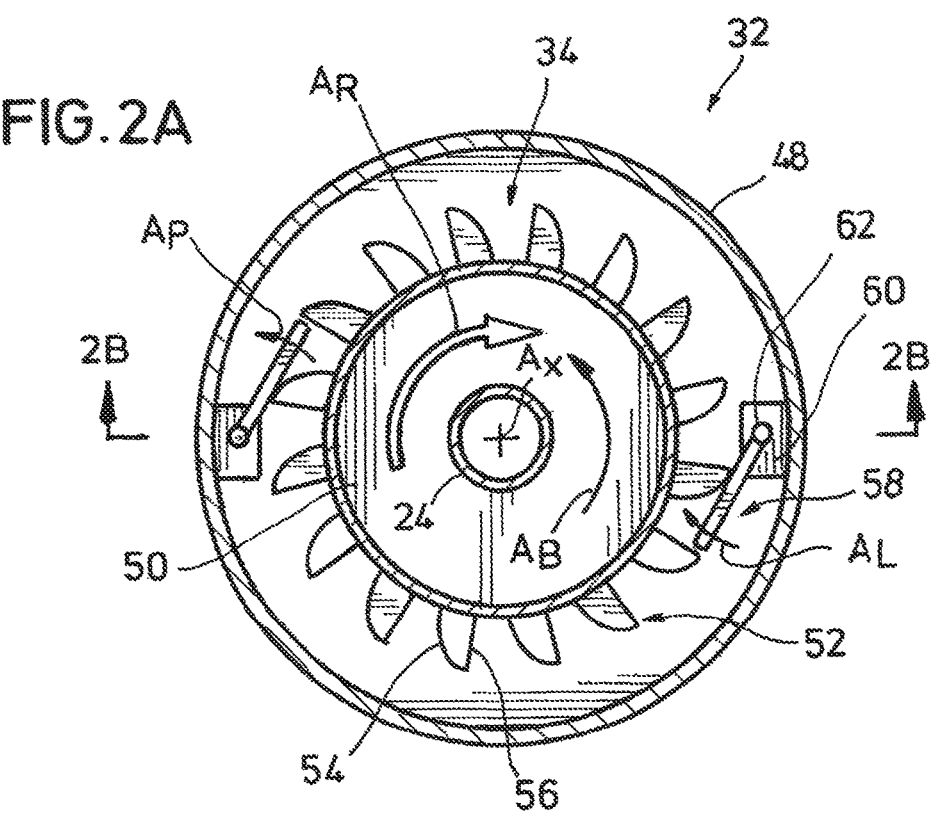
FIGS. 2A and 2B are plan and side sectional views of an example of an anti-backspin device for use with an ESP system.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in a side partial sectional view in FIG. 1 is an example of an electrical submersible pump ("ESP") system 10 deployed in a well 12 for lifting fluid F from within the well 12. The fluid F is shown entering well 12 from perforations 14 that extend radially outward from well 12 and into a surrounding formation 16. ESP system 10 includes a pump section 18 having impellers 20 and diffusers 22 that are arranged in alternating order to define a stack within the pump section 18. A shaft 24 is shown in dashed outline that extends axially from pump section 18 and couples with a motor 26 that is included in the ESP system 10. Motor 26 is powered by a power source 27 shown outside the well 12 and which connects to motor 26 via a power cable 28 that is inserted into the well 12. A monitoring sub 29 is optionally included with the ESP system 10, in the example of FIG. 1 sub 29 is shown on a lower end of the string of components making up the ESP system 10. The ESP system 10 includes a seal 30 for equalizing pressure in the motor 26 with pressure ambient to the ESP system 10. Seal 30 is shown disposed axially on a side of motor 26 opposite from monitoring sub 29. An anti-backspin assembly 32 is depicted on an end of the seal system 30 opposite from motor 26. Included within the anti-backspin assembly 32 is an anti-backspin device 34. Between the anti-backspin assembly 32 and motor section 18 is an inlet section 36 equipped with ports 38 that in the example shown receive fluid F that flows upward within well 12 and which is to be pressurized within the ESP system 10. Couplings 40 are shown at various locations along shaft 24, and which provide rotational engagement between sections of the shaft 24 disposed within motor section 18, anti-backspin assembly 32 and motor 26. Greater or fewer couplings 40 than those shown are optionally included in this embodiment. Fluid F pressurized within ESP system 10 is discharged into production tubing 42 attached to an upper end of the ESP system 10. An annulus 43 is formed between the tubing 42 and sidewalls of the well 12. Tubing 42 provides a pathway for the pressurized fluid to travel from the ESP system 10 and to a wellhead assembly 44 on surface 46. A packer 47 is shown spanning between tubing 42 and sidewalls of well 12 in annulus 43, and that diverts fluid F into ports 38 by blocking flow axially through annulus 43. Lines are shown extending laterally from the wellhead assembly 44 that carry fluid exiting the well 12 to locations remote from well 12 for additional transportation and/or processing.

Shown in FIG. 2A, which is taken along lines 2A-2A of FIG. 1, is a plan view of anti-backspin assembly 32 that is shown having an outer housing 48 in which the anti-backspin device 34 is located. In the example of FIG. 2A, anti-backspin device 34 includes a hub assembly 50 that couples to and circumscribes shaft 24 at an axial location of shaft 24. Hub assembly 50 is a planar member and shown oriented generally perpendicular to an axis $A_X$ of shaft 24. Teeth 52 are shown set along an outer periphery of the hub assembly 50 and projecting radially outward from hub assembly 50. Arrow $A_R$ illustrates an example rotational direction of the shaft 24 and hub assembly 50 during which the impellers 20 of FIG. 1 are rotating in a direction that pressurizes the fluid F for sending fluid F to the wellhead assembly 44, which in the example of FIG. 2A is in a clockwise direction. When the shaft 24 and hub assembly 50 rotate in the direction of arrow $A_R$ forward surfaces 54 on each of the teeth 52 are on leading sides of the teeth 52 and face towards the direction of rotation; on sides opposite the forward surfaces 54 are rearward surfaces 56, which are on lagging sides of the teeth 52 and face away from the direction of rotation. Forward surfaces 54 are shown having curved profiles that depend towards rearward surfaces 56 proximate the outer terminal ends of each of the teeth 52. Rearward surfaces 56 are shown extending along a generally radial path away from shaft 24. Elongate pawls or pawl members 58 are shown that each couple to respective base elements 60, the base elements 60 each attach directly to the inner surface of housing 48; the pawl members 58 are pivotingly coupled to the base elements 60 by pins 62 that allow the pawl members 58 to rotate about the respective pins 62.

In a non-limiting example of operation, as the hub assembly 50 rotates in the direction of arrow $A_R$ and the teeth 52 orbit past the pawl members 58. Portions of the pawl members 58 distal from the pins 62 are in a path of the teeth 52 as the teeth 52 orbit around axis $A_X$. The forward surfaces 54 of the teeth 52 are brought into sliding contact with the pawl members 58 as each of the teeth 52 successively orbit past the proximity of the pawl members 50. The forward surfaces 54 are profiled and the pawl members 58 are oriented so that when the shaft 24 rotates in the direction of arrow $A_R$, the sliding contact between the teeth 52 and pawl members 58 does not impede or interfere with operations or capabilities of the pump section 18 (FIG. 1). Further shown is that the pawl members 58 are rotatable about the pins 62 in a direction represented by arrow $A_P$, and are able to move out of interfering contact with each of the teeth 52 as they orbit past. In this example interaction between the teeth 52 and pawl members 58 does not hinder rotation of the shaft 24. It is within the capabilities of one skilled to form curved profiles on the teeth 52 and orient pawl members 58 so that operation or functionality of the pump section 18 remains at a level sufficient to satisfy pumping capacity.

Still referring to FIG. 2A, while interaction between the teeth 52 and pawl members 58 does not stop rotation of the shaft 24 or hub assembly 50 in the direction of arrow $A_R$ (i.e. in the direction consistent with anticipated pumping operations of the ESP system 10 of FIG. 1), rotation in the direction of arrow $A_B$, which is opposite to that of arrow $A_R$, is impeded. Rotating the shaft 24 and hub assembly 50 in the rotational direction represented by arrow $A_B$ brings the rearward surfaces 56 into abutting contact with free ends of the pawl members 58. In the illustrated embodiment, while the pinned connections between the pawl members 58 and their respective base members 60 allow pivoting of the pawl members 58 in the direction of arrow $A_P$, the pinned connections block pivoting in the opposite direction as shown by arrow $A_L$. Blocking pivoting in the direction of arrow $A_L$ maintains the pawl members 58 in abutting contact with the rearward surfaces 56 of the teeth 52 and in interfering contact with the teeth 52 to prevent the rotation of the hub assembly 50 and attached shaft 24 in the backspin direction of arrow $A_B$. In this example, backspin of the shaft 24 is prevented by the pawl members 58 and teeth 52 of the anti-backspin device 34 and that in turn vents components within motor from backspinning to generate electricity that can be transferred via the power cable 28.

Figure 2B:
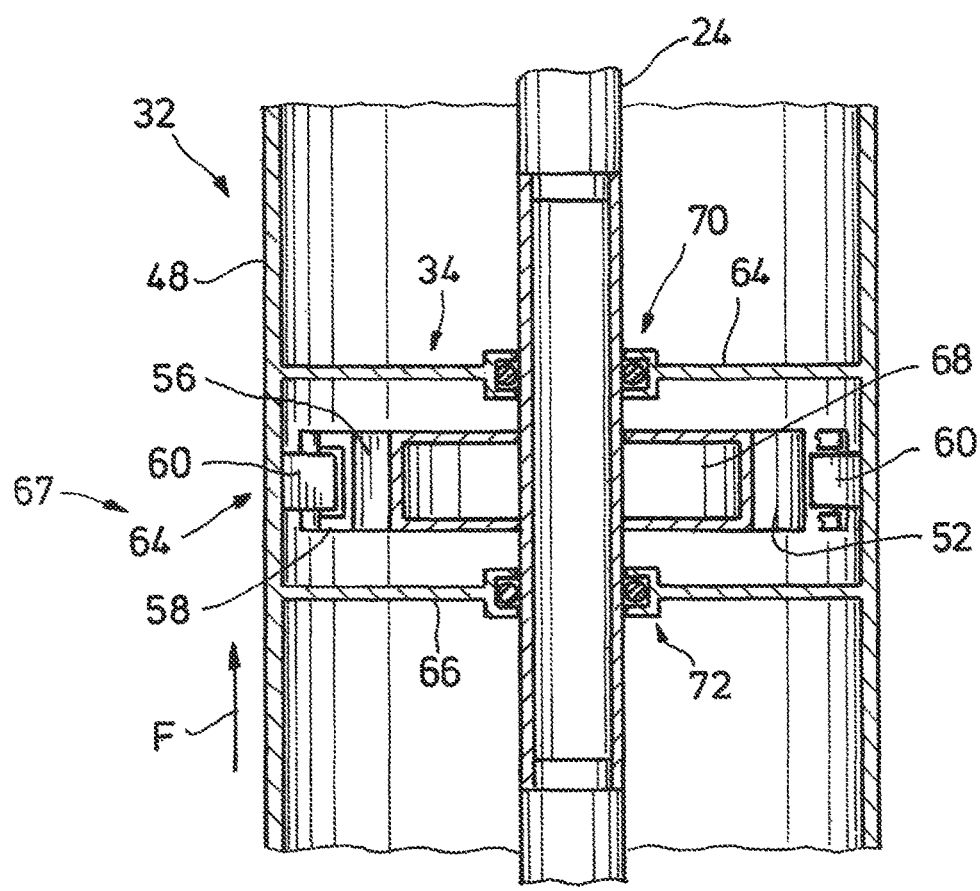

Provided in FIG. 2B is an example of the anti-backspin assembly 32 of FIG. 2A in a side sectional view and taken along lines 2B-2B of FIG. 2A; and that shows radial walls 64, 66 spanning the radial distance between shaft 24 and housing 48. Walls 64, 66 along with housing 48 define an enclosure 67 around the lower portion of the anti-backspin device 34 and in which an amount of lubricant 68 is retained for providing lubrication of the moving parts of the anti-backspin device 34. Examples of lubricant include oil, grease, silicon based compounds, graphite, and combinations. Radial seals 70, 72 are shown disposed in the interface between shaft 24 and walls 64, 66. In an example, included are bearings (not shown) to facilitate rotation of shaft 24 with respect to the walls 64, 66. Also illustrated in this example is fluid F flowing axially past the outer surface of housing 48 and along its outer surface.

Shown in a side partial sectional view in FIG. 3 is an alternate example of ESP system 10A that includes a stinger 74A on a lowermost end of the string of components making up the ESP system 10A. In this example a lower packer 76A is shown spanning an annulus 77A between the stinger 74A and sidewalls of wellbore 12A, lower packer 76A blocks fluid F from entering annulus 77A and directs fluid F into a lower end of stinger 74A. In the illustrated embodiment the anti-backspin assembly 32A is positioned adjacent the stinger 74A and below the pump section 18A. A discharge sub 78A is shown inserted in the ESP system 10A between an end of the pump section 18A opposite the anti-backspin assembly 32A and the seal section 30A. Outlet ports 80A are shown formed through a sidewall of discharge sub 78A and that provide an opening for fluid $F_P$ that has been pressurized by pump section 18A to exit into annulus 77A. A flow coupling 84A is included in the example shown that is disposed on an upper end of the system 10A that attaches to production tubing 42A. In this embodiment inlet ports 86A are shown receiving pressurized fluid $F_P$, which after entering flow coupling 84A is directed into the production tubing 42A.

Figure 4A:
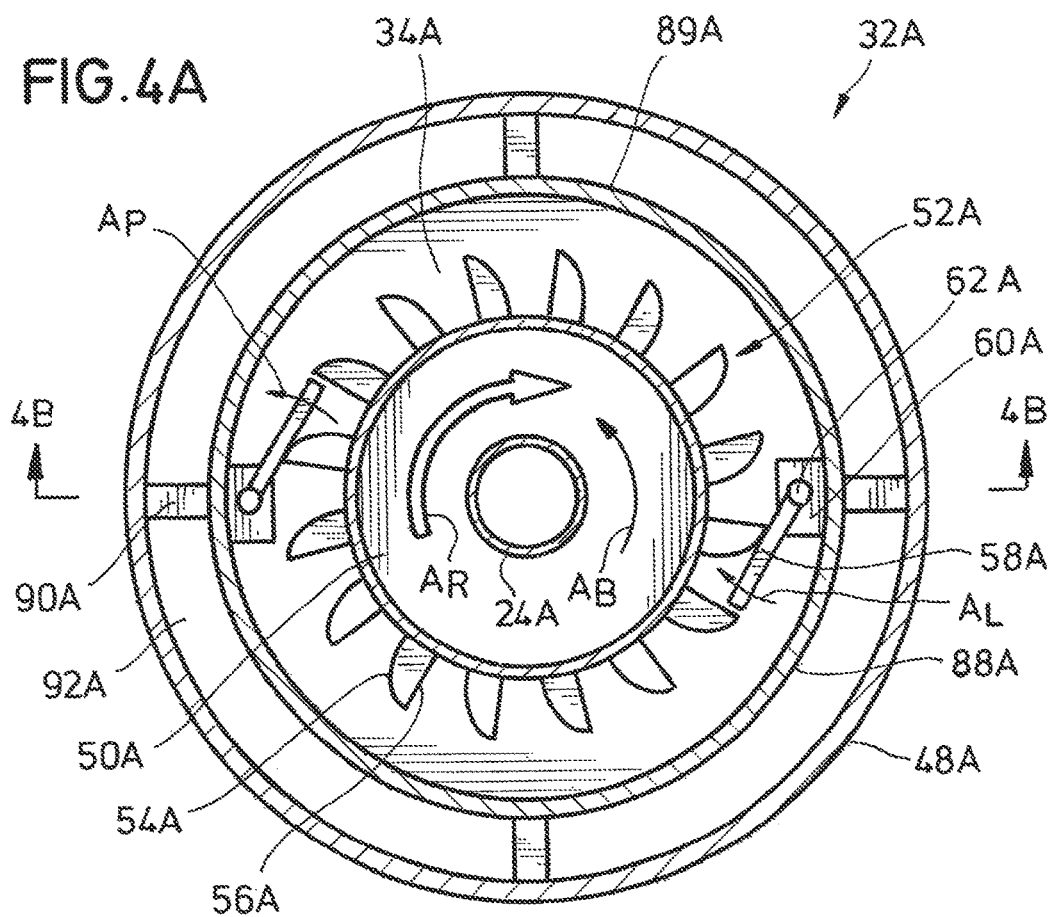
FIGS. 4A and 4B are plan and side sectional views of an alternate example of the anti-backspin device of FIGS. 2A and 2B.

Referring now to FIG. 4A, a plan view of anti-backspin assembly 32A of FIG. 3 is shown and which is taken along lines 4A-4A of FIG. 3. In this example, anti-backspin device 34A includes a planar hub assembly 50A mounted to the outer circumference of shaft 24A and having teeth 52A with forward and rearward surfaces 54A, 56A. Similar to the operation of the anti-backspin device 34 of FIG. 2A, pawl members 58A are pivotingly mounted onto base member 60A that attach to an inner surface of the housing 48A and provide the pinned connection that allows rotation of the shaft 24A in a direction $A_R$ but preventing rotation in the opposite direction of $A_B$. Also similarly, the pins 62A couple pawl members 58A to the base members 60A to allow pivoting of pawl members 58A in the direction of arrow $A_P$, while also blocking rotation of the pawl members 58A in the direction of arrow $A_L$. The embodiment of the anti-backspin assembly 32A of FIG. 4A includes an inner housing 88A shown disposed within outer housing 48A, and with sidewalls 89A shown spaced radially inward from outer housing 48A. Housings 48A, 88A each have a generally circular axial cross section. In the alternative shown web members 90A provide support to mount the inner housing 88A within outer housing 48A. A radius of inner housing 88A is less than outer housing 48A to define an annular passage 92A between housings 48A, 88A. As described in more detail below passage 92A provides a conduit for the flow of fluid F axially past the anti-backspin assembly 32A.

Figure 4B:
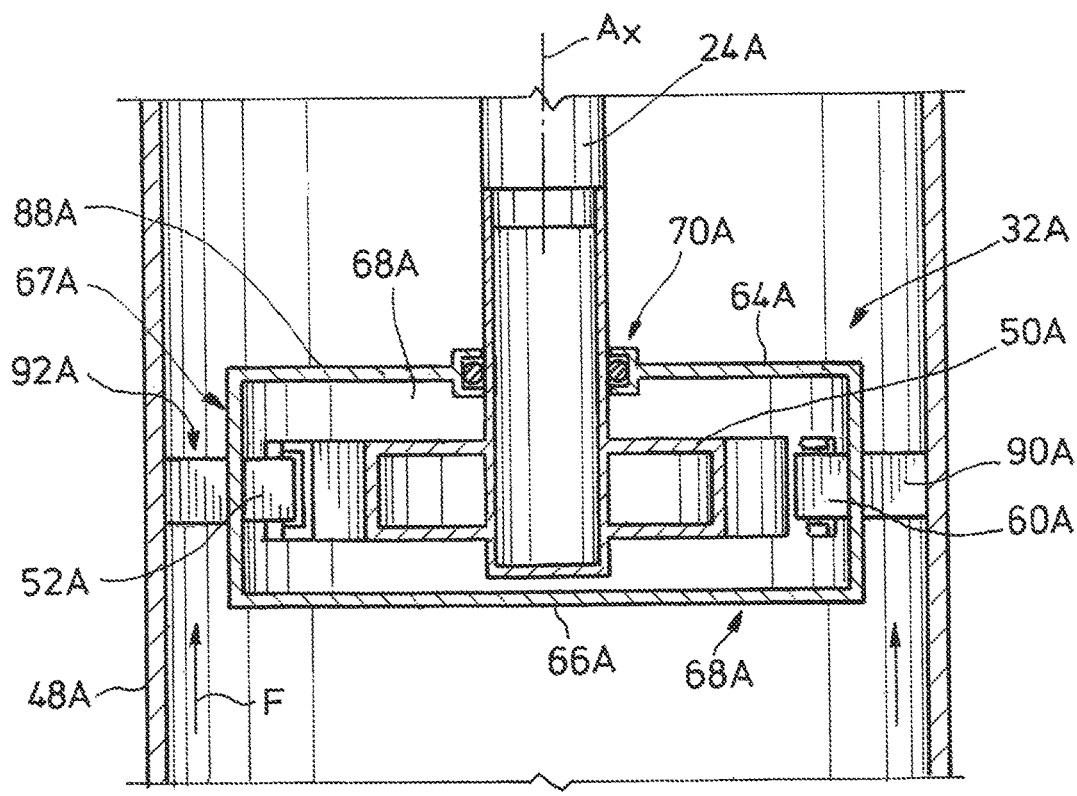

Referring to FIG. 4B a sectional plan view of backspin assembly 32A is shown that is taken along lines 4B-4B of FIG. 4A. In this example fluid F is shown flowing axially through passage 92A and outside of inner housing 88A, sidewalls of inner housing 88A are shown extending axially and generally parallel with shaft 24A. Housing 88A includes upper and lower radial walls 64A, 66A that span radially between the sidewalls 89A. In this example, shaft 24A terminates adjacent the hub assembly 50A and as an end within the enclosure 67A facing lower radial wall 66A. Upper radial wall 64A of housing of 88A is intersected by shaft 24A, and a seal assembly 70A is included in the interface between radial wall 64A and shaft 24A to prevent communication from enclosure 68A and to outside of housing 88A. Similar to the example of FIG. 2B, a lubricant 68A is scored and maintained within the housing 88A to facilitate relative movement of components inside of housing 88A.

Figure 5A:
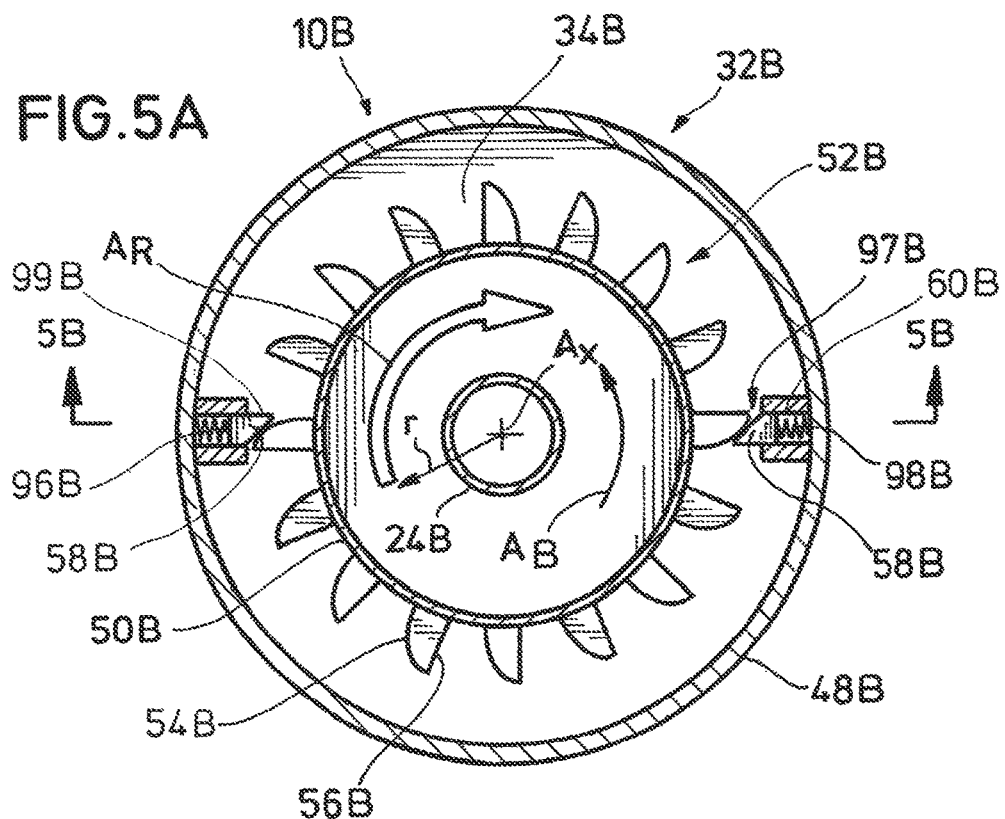
FIGS. 5A and 5B are plan and side sectional views of an alternate example of the anti-backspin device of FIGS. 2A and 2B.

FIG. 5A is a plan view of an alternative example of a portion of the ESP assembly 10B taken along lines 5A-5A of FIG. 1, the portion shown contains the anti-backspin assembly 32B. In this example, pawl members 58B are disposed in radial slots 96B formed within the base members 60B. The pawl members 58B of FIG. 5A are shown having front surfaces 97B; and when the shaft 24B and attached hub assembly 50B rotate in the direction of arrow $A_R$, front surfaces 97B are on sides of pawl members 58B facing the forward surfaces 54B of the teeth 52B. In a non-limiting example of operation, rotation of shaft 24B in the direction of normal operation as represented by arrow $A_R$ moves the teeth 52B about shaft 24B along an orbital path. The pawl members 58B are strategically located in the orbital path that results in impacts between the forward and front surfaces 54B, 97B each time one of the teeth 52B orbit past one of the pawl members 58B. The surfaces 54B, 97B are profiled complementary to one another, and similar to operation of the embodiment of FIG. 2A the impacts result in sliding contact between the teeth 52B and pawl members 58B.

In an example of operation of the ESP system 10B of FIG. 5A, the frictional or other resistive forces generated by the sliding contact is within an acceptable level that does not negatively affect operation of the ESP assembly 10B. In this example, acceptable levels of resistive forces are at or below forces that would impede ability of the ESP system 10B to lift fluids from the well 12 (FIG. 1), or lift the fluids at a designated flow rate. It is within the capabilities of one skilled to identify or determine a designated flow rate. Further included in the example of 5A are resilient members 98A within the slots 96B that bias the pawl members 58B radially inward into the orbital path of the teeth 52B. In an example, the outward radial force exerted on the pawl members 58B during sliding contact with the teeth 52B exceeds the biasing force exerted by the resilient members 98B and the pawl members 58B are urged radially outward and out of the orbital path of the teeth 52B. Also during sliding contact the resilient members 98B are put into a compressed configuration by the outer radial movement of the pawl members 58B. As each of the teeth 52B orbit past and out of contact with the pawl members 58B, the resilient members 98B return to their uncompressed configuration and bias the pawl members 58B back into the orbital path of the teeth 52B. Back surfaces 99B of the pawl members 58B extend radially inward, and in an example when shaft 24B rotates in a backspin direction as denoted by arrow $A_B$ that brings rearward surfaces 56B of teeth 52B into contact with back surfaces 99B of pawl members 58B, forces resulting from this contact do not urge the pawl members 58B radially outward, but instead generates counter forces that prevent rotation of the hub assembly 50B in the backspin direction. The corresponding radial profiles of the rear surface 99B and rearward surface 56B generate resultant forces that are generally tangential to a radius r of the anti-backspin assembly 32B, unlike interaction between the obliquely oriented surfaces of the surfaces 54B, 99B that result in radially oriented forces that bias the pawl members 58B out of the orbital path of the teeth 52B.

Figure 5B:
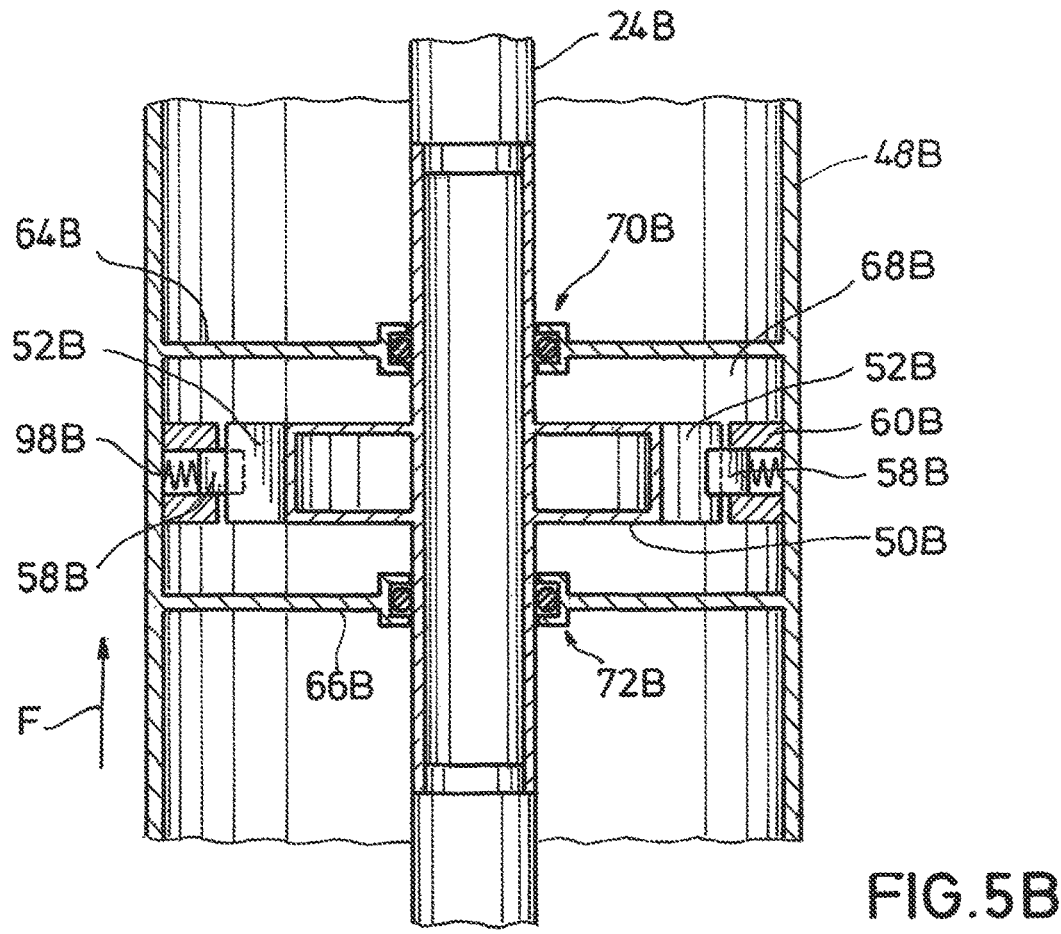

An axial sectional view of the anti-backspin device 34B is provided in FIG. 5B and taken along lines 5B-5B of FIG. 5A. In this example, radial walls 64B, 66B are shown between shaft 24B and inner surface of housing 48B. Seals 70B, 72B are between shaft 24B and walls 64B, 66B to allow rotational movement of shaft 24B and while retaining lubricant 68B within the enclosure 67B formed by the walls 64B, 66B and housing 48B. In an alternative, bearings (not shown) are included with the seals 70B, 72B. In one example the lengths of pawl members 58B extend deeper into the slots 96B towards housing 48B resulting in springs 98B having shorter uncompressed lengths. In this example, when spring members 98B are uncompressed the pawl-spring system is such that a majority of each of the pawl members 58B remains recessed within the slots 96B preventing pawl members 58B from being pushed out of the slots 96B. The thicknesses of the walls around the slots 96B are optionally increased to further withstand forces due to backspin; in this example increased wall thicknesses increases shear areas between walls of slot 96B and the inner section of housing 48B to ensure the walls of slot 96B provide additional backspin force resistance.

Figure 6A:
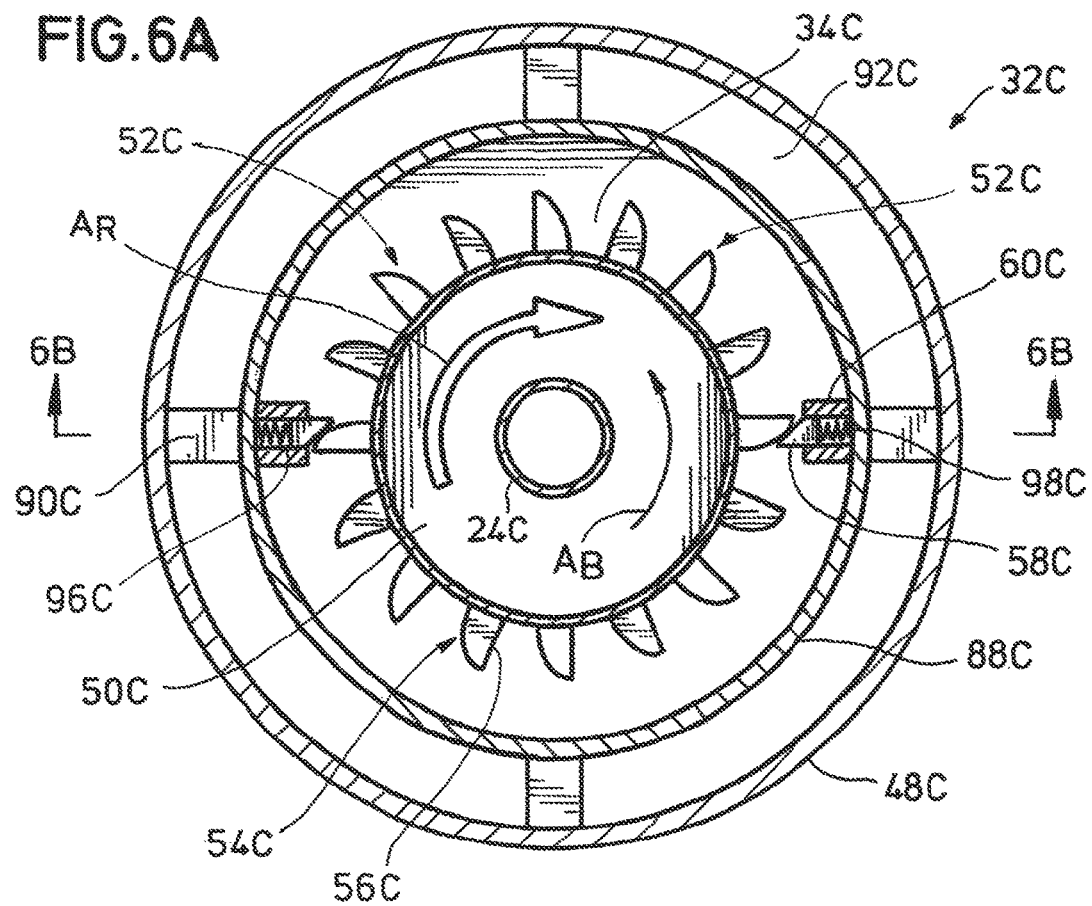
FIGS. 6A and 6B are plan and side sectional views of an alternate example of the anti-backspin device of FIGS. 2A and 2B.
Figure 6B:
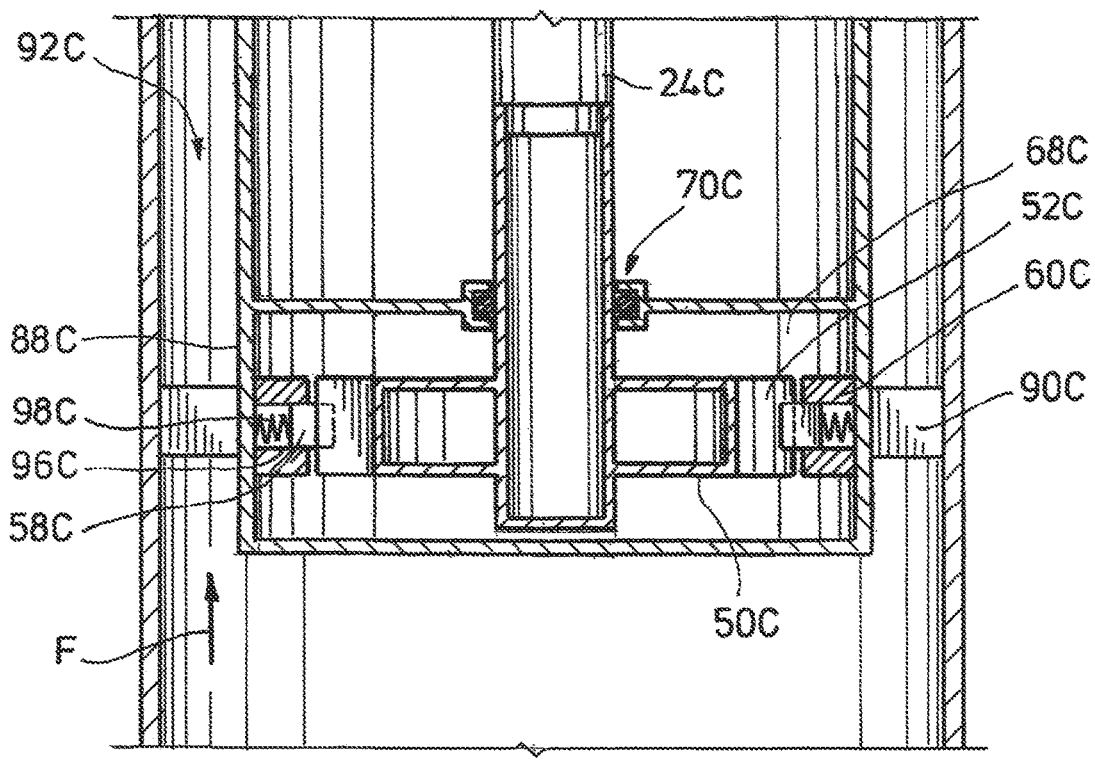

Another alternate example of the anti-backspin assembly 32C is shown in a plan view in FIG. 6A and taken along lines 6A-6A of FIG. 3; and similar to that of FIG. 4A includes a passage 92C shown formed between inner and outer housings 88C, 48C. Similar to the embodiment of FIG. 5A are pawl members 58C and corresponding base members 60C shown along the inner surface of inner housing 88C. Operation between forward and rearward surfaces 54C, 56C of the teeth 52C with the pawl members 58C of FIG. 6A are similar to that described above with reference to the anti-backspin assembly 32B of FIGS. 5A and 5B. The passage 92C of FIG. 6A provides functionality similar to that of FIG. 4A and the passage 92A shown therein. Shown in FIG. 6B is a side sectional view of the example of the anti-backspin assembly 32C of FIG. 6A, having housing 88C with a lower radial wall 66C that is not intersected by shaft 24C and an upper radial wall 64C that is intersected by shaft 24C, a seal 70C is shown in the interface between shaft 24C and upper wall 64C of housing 88C. Bearings (not shown) are optionally included in seal 70C. Similar to the operation of the anti-backspin assembly 32A of FIG. 4A, fluid F flowing within passage 92C provides a cooling effected by absorbing thermal energy generated between relative moving parts within the anti-backspin assembly 32C.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. In an example, resilient member includes a spring, an elastomer, a fluid filled resilient system, or combinations. In another example, a single tooth is used in place of the teeth and a single pawl or pawl member is used in place of the pawls or pawl members. In an alternative embodiment a stop member (not shown) is added in one side of the slot 96B, 96C and next to the spring 98B, 98C of FIGS. 5A, 5B, 6A, 6B to keep the pawl member 58B, 58C from being pushed radially outward and out of the path of the teeth 52B, 52C during backspin. These and other similar modifications will readily suggest themselves to those skilled in the art, and are intended to be encompassed within the spirit of the present invention disclosed herein and the scope of the appended claims.

What is claimed is:

1. An electrical submersible pumping system for lifting fluid from a well comprising:
    a pump in selective communication with the fluid;
    a structure;
    a motor rotationally coupled to the pump by a shaft that selectively rotates with respect to the structure; and
    an anti-backspin device comprising,
        a tooth mounted on the shaft that follows a rotational path with rotation of the shaft,
        a pawl coupled to the structure and disposed in a location that is intersected by the rotational path,
        a profile on a forward surface of the tooth that is in selective sliding contact with the pawl when the shaft rotates in a forward direction, and
        a profile on a rearward surface of the tooth that is in interfering contact with the pawl when the shaft rotates in a backspin direction and that restricts rotation of the shaft in the backspin direction.

2. The electrical submersible pumping system of claim 1, wherein the structure comprises a solid member affixed within a housing, wherein the housing covers a portion of the electrical submersible pumping system.

3. The electrical submersible pumping system of claim 1, wherein the pawl comprises an elongated member having an end pinned to the structure and an opposing end that abuts the rearward surface of the tooth when the shaft rotates in the backspin direction.

4. The electrical submersible pumping system of claim 1, wherein the pawl is disposed in a slot formed in the structure.

5. The electrical submersible pumping system of claim 4, wherein the pawl is urged radially inward by a resilient member in the slot.

6. The electrical submersible pumping system of claim 1, wherein the pawl comprises a first pawl, the location comprises a first location, and wherein a second pawl is coupled to the structure at a second location that is intersected by the rotational path, and wherein the second location is spaced away from the first location.

7. The electrical submersible pumping system of claim 1, wherein fluid being handled by the pump flows through a passage in the structure that is spaced radially outward from the rotational path.

8. The electrical submersible pumping system of claim 7, wherein the passage is strategically disposed to absorb thermal energy from the anti-backspin device.

9. The electrical submersible pumping system of claim 7, wherein the pawl is disposed in a slot in the structure.

10. The electrical submersible pumping system of claim 1, further comprising a covering around the tooth and pawl that defines a sealed enclosure, and wherein a lubricant is retained in the sealed enclosure.

11. The electrical submersible pumping system of claim 1, wherein the pump, motor, and anti-backspin device comprise a string that mounts to a lower end of production tubing that is disposed in the well, wherein the structure comprises an outer housing of the anti-backspin device, and wherein the anti-backspin device can be installed at different locations along a length of the string.

12. An electrical submersible pumping system for lifting fluid from a well comprising:
    a housing deployed in the well;
    a pump having impellers, diffusers, an inlet in communication with wellbore fluid, and a discharge in communication with pressurized wellbore fluid;
    a motor in electrical communication with a source of electricity;
    a shaft disposed in the housing having opposing ends respectively coupled with the pump and the motor;
    a tooth attached to an outer surface of the shaft; and
    a pawl coupled with the housing that is in sliding contact with the tooth when the shaft rotates in a forward direction, and in interfering contact with the tooth when the shaft rotates in a backspin direction and that blocks rotation of the shaft in the backspin direction.

13. The electrical submersible pumping system of claim 12, wherein the housing, pawl, and tooth define an anti-backspin device which can be installed at either opposing end of the pump, or at either opposing end of the motor.

14. The electrical submersible pumping system of claim 13, wherein the anti-backspin device comprises a cover that encloses portions of axial ends of the anti-backspin device to define an enclosure.

15. The electrical submersible pumping system of claim 14, wherein a passage extends axially through the anti-backspin device and radially outward from the pawl.

16. The electrical submersible pumping system of claim 14, wherein wellbore fluid being handled by the pump flows through the passage.

17. The electrical submersible pumping system of claim 16, wherein the shaft extends axially through portions of the cover, and bearings are disposed along an interface between the shaft and cover.

18. The electrical submersible pumping system of claim 17, wherein the passage is strategically placed so that thermal energy generated in the bearings by rotation of the shaft is transferred to the fluid flowing through the passage.

* * * * *